(12) United States Patent
Zominy (10) Patent No.: US 12,424,701 B2
(45) Date of Patent: Sep. 23, 2025

(54) ENERGY STORAGE ASSEMBLY DEVICE FOR AN AEROSOL GENERATION DEVICE

(71) Applicant: JT International SA, Geneva (CH)

(72) Inventor: Claude Zominy, Copponex (FR)

(73) Assignee: JT International S.A. (CH)

( * ) Notice: Subject to any disclaimer, the term of this patent is extended or adjusted under 35 U.S.C. 154(b) by 608 days.

(21) Appl. No.: 17/766,936

(22) PCT Filed: Oct. 7, 2020

(86) PCT No.: PCT/EP2020/078165
§ 371 (c)(1),
(2) Date: Apr. 6, 2022

(87) PCT Pub. No.: WO2021/069520
PCT Pub. Date: Apr. 15, 2021

(65) Prior Publication Data
US 2023/0133479 A1    May 4, 2023

(30) Foreign Application Priority Data

Oct. 7, 2019    (EP) ..................................... 19201729

(51) Int. Cl.
*H01M 50/325*    (2021.01)
*A24F 40/485*    (2020.01)
*H01M 50/102*    (2021.01)

(52) U.S. Cl.
CPC ......... *H01M 50/325* (2021.01); *A24F 40/485* (2020.01); *H01M 50/102* (2021.01); *H01M 2200/20* (2013.01); *H01M 2220/30* (2013.01)

(58) Field of Classification Search
CPC . A24F 40/485; H01M 10/425; H01M 10/488; H01M 2200/20; H01M 2220/30;
(Continued)

(56) References Cited

U.S. PATENT DOCUMENTS 6,322,921 B1 * 11/2001 Iwaizono .............. H01M 10/48
429/61
2014/0154536 A1    6/2014  Coupar et al.
(Continued)

FOREIGN PATENT DOCUMENTS

CN    1197550 A    10/1998
CN    2798319 Y    7/2006
(Continued)

OTHER PUBLICATIONS

Machine translation WO2016000214A1 (Year: 2016).*
(Continued)

*Primary Examiner* — Victoria H Lynch
(74) *Attorney, Agent, or Firm* — Lerner David LLP (57) ABSTRACT

An energy storage assembly device for an aerosol generation device includes a housing intended for housing a battery; a vent component configured to vent pressurized gases from within the housing upon a predetermined pressure in the housing; whereby the housing has an elongated shape; and the housing includes on a circumference of the housing at a first extremity which is free on the inside from being filled by the battery, a first plurality of holes blinded by a blinding member, the first plurality of holes and the blinding member each being part of the vent component.

20 Claims, 8 Drawing Sheets

(58) Field of Classification Search
CPC .... H01M 50/102; H01M 50/20; H01M 50/30; H01M 50/325; H01M 50/3425; H01M 50/578; Y02E 60/10
See application file for complete search history.

(56) References Cited

U.S. PATENT DOCUMENTS

| | | |
|---|---|---|
| 2016/0218336 A1 | 7/2016 | Herrmann et al. |
| 2017/0098808 A1 | 4/2017 | Guen |
| 2017/0170439 A1 | 6/2017 | Jarvis et al. |
| 2019/0096591 A1 | 3/2019 | Tsuchiya et al. |
| 2020/0313129 A1 | 10/2020 | Koutari et al. |
| 2020/0386816 A1* | 12/2020 | Jeong ................. G01R 31/2872 |

FOREIGN PATENT DOCUMENTS

| | | | | |
|---|---|---|---|---|
| CN | 202308123 U | 7/2012 | | |
| CN | 103847496 A | 6/2014 | | |
| CN | 106981596 A | 7/2017 | | |
| CN | 107210403 A | 9/2017 | | |
| CN | 207441831 U | 6/2018 | | |
| CN | 109417139 A | 3/2019 | | |
| CN | 106455701 B | 6/2019 | | |
| CN | 209401710 U | 9/2019 | | |
| JP | 2013089375 A | 5/2013 | | |
| JP | 2018137104 A | 8/2018 | | |
| JP | 2019062082 A | 4/2019 | | |
| WO | WO-2006116233 A1 * | 11/2006 | .......... | H01M 2/1229 |
| WO | WO-2016000214 A1 * | 1/2016 | ............ | A24F 47/00 |
| WO | 2016026051 A1 | 2/2016 | | |
| WO | 2016123020 A1 | 8/2016 | | |
| WO | 2017213132 A1 | 12/2017 | | |

OTHER PUBLICATIONS

International Search Report for Application No. PCT/EP2020/078165 mailed Dec. 22, 2020, pp. 1-3.

Search Report dated May 22, 2024 from the Office Action for Chinese Application No. 202080070523.7 issued May 22, 2024, pp. 1-3.

Search Report dated Oct. 16, 2024 from the Office Action for Chinese Application No. 202080070523.7 Issued Oct. 19, 2024, pp. 1-3.

* cited by examiner

ENERGY STORAGE ASSEMBLY DEVICE FOR AN AEROSOL GENERATION DEVICE

CROSS-REFERENCE TO RELATED APPLICATIONS

The present application is a national phase entry under 35 U.S.C. § 371 of International Application No. PCT/EP2020/078165, filed Oct. 7, 2020, published in English, which claims priority to European Application No. 19201729.1 filed Oct. 7, 2019, the disclosures of which are incorporated herein by reference.

TECHNICAL FIELD

The invention is in the field of aerosol generation devices, and more specifically in safety aspects of using a battery in an aerosol generation device.

BACKGROUND

Prior art reference US 2017/0170439 A1 is generally directed to an energy storage device. More specifically, it relates to an energy storage device assembly configured with a housing or container, a current interrupt device configured with the housing to electrically disconnect the energy storage assembly from communication current through its component, and a vent component/device configured to vent pressurized gases. A vent area substrate is configured to attach to the housing (e.g., lid and/or body), and the vent is configured to open in a predetermined manner such that the substrate tears/separates along a predetermined path across/around at least a portion of the substrate. In the disclosure of this document, the vent comprises a vent panel (e.g. an area having a reduced thickness, as compared to the body and/or cover, such that the vent area/vent panel is configured to tear/rupture at the location of reduced thickness.

Aerosol generation devices however inherently bring challenges for the design of the venting holes, because of the comparatively little space available in the body of the aerosol generation device, and particular aspects related to the external appearance of the aerosol generation device.

Furthermore, a design of an aerosol generation device and its energy storage assembly should be such to minimize any risk of harming the user.

The present invention aims at overcoming the challenges for the design of the venting holes, mentioned herein above.

SUMMARY OF INVENTION

The invention provides an energy storage assembly device for an aerosol generation device, comprising a housing intended for housing a battery; a vent component configured to vent pressurized gases from within the housing upon a predetermined pressure in the housing; whereby the housing has an elongated shape; and the housing comprises on a circumference of the housing at a first extremity which is free on the inside from being filled by the battery, a first plurality of holes blinded by a blinding member, the first plurality of holes and the blinding member each being part of the vent component.

In a preferred embodiment, the blinding member has towards the first plurality of holes a first visual aspect different from and contrasting with a second visual aspect of the housing as visible from an outside, in a way that any blinding member alteration is easily visually detected by an intended user.

In a further preferred embodiment, each of the holes of the first plurality of holes has an oval shape, oriented according to a longitudinal direction of the elongated shape.

In a further preferred embodiment, the housing comprises on a circumference of the housing at a second extremity, opposite to the first extremity, which is free on the inside from being filled by the battery, a second plurality of holes blinded by a second blinding member, the second plurality of holes and the second blinding member each being part of the vent component.

In a further preferred embodiment, the blinding member blinds the plurality of holes from an inside of the housing.

In a further preferred embodiment, the blinding member comprises a sleeve configured to deform in case of the predetermined pressure occurring inside the housing to open the plurality of holes.

In a further preferred embodiment, the blinding member is configured to be pushed away from the plurality of holes to open at least a part of the plurality of holes in case of the predetermined pressure occurring inside the housing.

In a further preferred embodiment, the blinding member comprises a carrier configured to carry a printed circuit board assembly connecting to the battery through breakable electrical connections.

In a further preferred embodiment, the inside of the housing comprises a plurality of fixation points configured to fix the blinding member to the inside of the housing.

In a further preferred embodiment, the blinding member blinds the plurality of holes from the outside of the housing.

In a further preferred embodiment, the blinding member comprises a material from the list comprising a water-repellent coated sheet of material, such as silicon rubber or aluminum.

In a further preferred embodiment, the blinding member is made out of a same material as the wall of the housing; further a first wall thickness of housing wall portions corresponds to the blinding member blinding the first plurality of holes, is smaller than a second normal wall thickness of the housing, in order to enable a preferred rupture point at a location of the first plurality of holes.

In a further preferred embodiment, the energy storage assembly further comprises the battery housed in the housing, the battery comprises venting apertures configured to vent pressurized gases from inside the battery.

BRIEF DESCRIPTION OF THE DRAWINGS

The invention will be better understood through the detailed description of preferred embodiments, and in reference to the drawings, wherein FIG. 1 schematically illustrates in a sectional view an example embodiment for an energy storage assembly device for an aerosol generation device, according to the invention.

Same references will be used to designate same or similar features throughout the following description.

DETAILED DESCRIPTION OF PREFERRED EMBODIMENTS

In case a battery cell is damaged inside an energy storage device, it may produce gases by a process of venting (also known as thermal runaway) that may increase a pressure inside the energy storage device and produce an overheating. In case the energy storage device is used inside of an aerosol generation device, it should at all cost be avoided to harm an intended user. In order to avoid this, it is important to release the gases outside of the battery and energy storage device. One obvious way of releasing the gases is to provide one or more venting holes in the energy storage device allowing the gases to flow to the outside. However, such venting holes pose a security risk since they may allow water or liquid, e.g., e-liquid, to enter the energy storage device and potentially cause safety issues, such as a short circuit. Moreover, one or more venting holes may not provide any indication for the intended user to detect that the battery cell has vented unless the battery cell becomes fully inoperational after the venting. Such indication can provide the user with knowledge about the health state of the battery, so that the user can be informed to replace the battery or stop using the device, avoiding dangerous using situations.

The invention provides a solution for implementing venting holes in an energy storage device in which the venting holes are blinded by a blinding member during normal operation. In case of venting, the venting holes are opened by gas pressure as the blinding member is compressed by the pressure. Open holes may be observed by the intended user, providing the information that the battery cell has vented and that the device must be discarded.

The blinding member may comprise a material such as for example a water-repellent coated sheet of material, silicon rubber, aluminum, hence achieving a water resistant sealing during normal operation.

Figure 1:
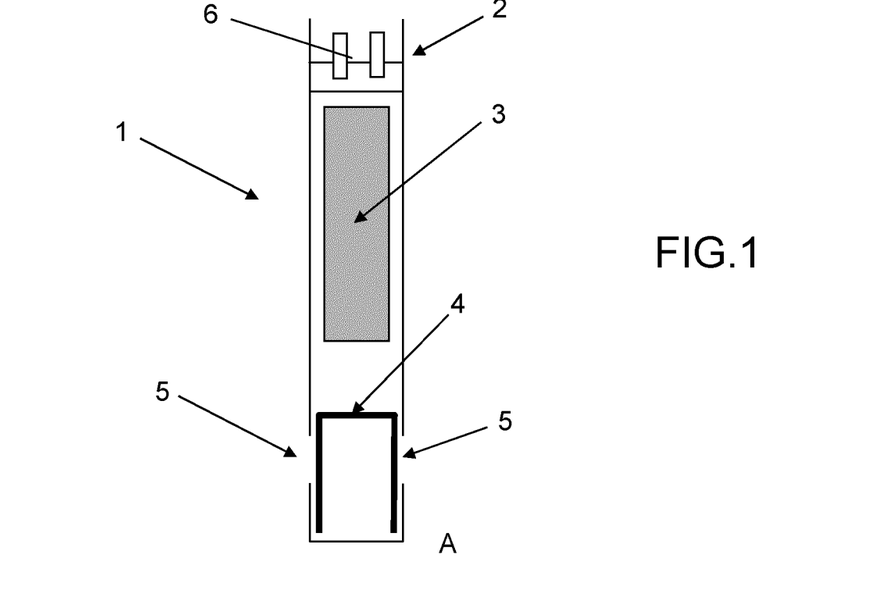

Referring to FIG. 1, this schematically illustrates in a sectional view an example embodiment for an energy storage assembly device 1 for an aerosol generation device (aerosol generation device not shown in FIG. 1). The energy storage assembly device 1 comprises a housing 2 intended for housing an intended battery 3, the latter being illustrated in FIG. 1 for a better understanding, but is not necessary being part of the invention. A vent component 4, 5 is configured to vent pressurized gases (gases not illustrated in FIG. 1) from within the housing 2 upon a predetermined pressure in the housing 2. FIG. 1 further illustrates electrical contacts 6 which may be configured to contact the intended battery 3. Such electrical contacts 6 may be considered to be standard equipment for any energy storage assembly device. The housing 2 has an elongated shape, which in the example of FIG. 1 is somehow rectangular when seen in the illustrated section. The energy storage device assembly is a 3-dimensional device, which may for example be a hollow rectangular bar or a cylinder.

The housing 2 comprises on a circumference of the housing at a first extremity A which is free on the inside from being filled by the battery 3, a plurality of holes 5 blinded by a blinding member 4, both of the plurality of holes 5 and the blinding member 4 being part of the vent component.

Herein, an extremity refers to the region between a location where the battery 3 is intended to be arranged and an end of the housing. Accordingly, extremity A is not limited to the furthest part of the housing towards end A, and also includes a middle region as shown in FIG. 1. Furthermore, the plurality of holes 5 may be replaced with one single hole 5.

The blinding member 4 has, at least towards the plurality of holes 5 a first visual aspect different from and contrasting with a second visual aspect of the housing 2 as visible from an outside, in a way that any blinding member alteration is easily visually detected by an intended user (visual aspects and intended user are not illustrated in FIG. 1). A visual aspect may be an effect that is perceivable by a human eye, such as for example an angle at which light is reflected, a surface pattern, a color. In the present example, the blinding member 4 is internal to the housing 2 and made out of a comparatively soft material, the reason for which will become apparent when discussing FIG. 2.

Figure 2:
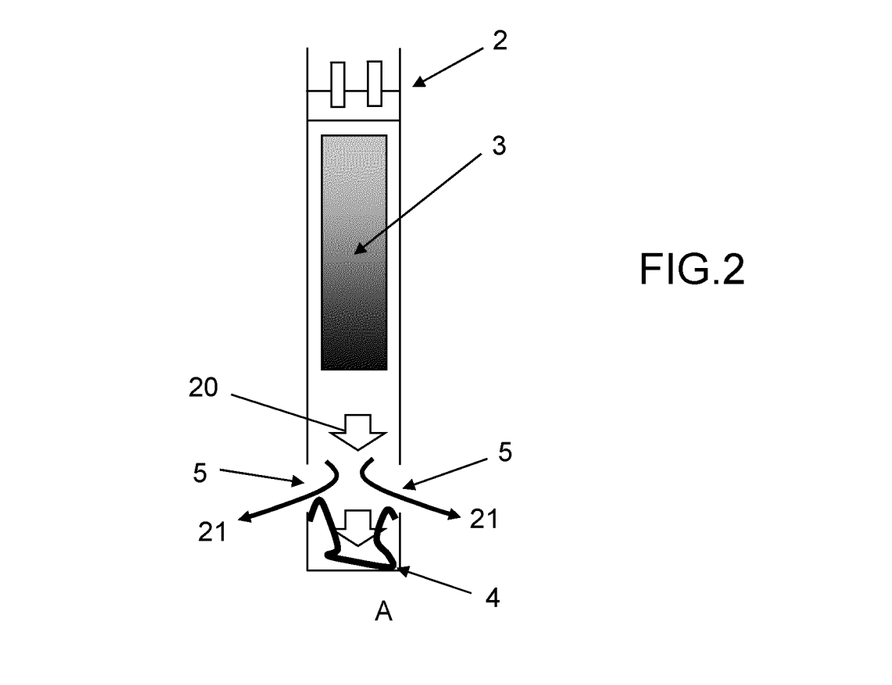
FIG. 2 schematically illustrates the example embodiment for an energy storage assembly device as shown in FIG. 1, after an intended battery has vented.

Referring to FIG. 2, this schematically illustrates the example embodiment for the energy storage assembly device 1 as shown in FIG. 1, after the battery 3 has vented. The venting causes the production of pressurized gas which exerts pressure toward the first extremity A as illustrated by thick arrows 20 and, in case a predetermined pressure occurs and is exceeded inside the housing 2, pushes the blinding member 4 towards the first extremity A, thereby deforming the blinding member 4, which is made comparatively easy due to the soft material out of which it is made. The venting holes 5 are opened allowing venting gases 21 to escape through them. In other words, the blinding member 4 is configured to be pushed away from the plurality of holes 5 to open at least a part of the plurality of holes 5 in case of the predetermined pressure occurring inside the housing 2.

In a preferred embodiment, the first visual aspect and the second visual aspect are respectively a first color and a second color.

In a further preferred embodiment, the blinding member 4 may be a sleeve.

Figure 3:
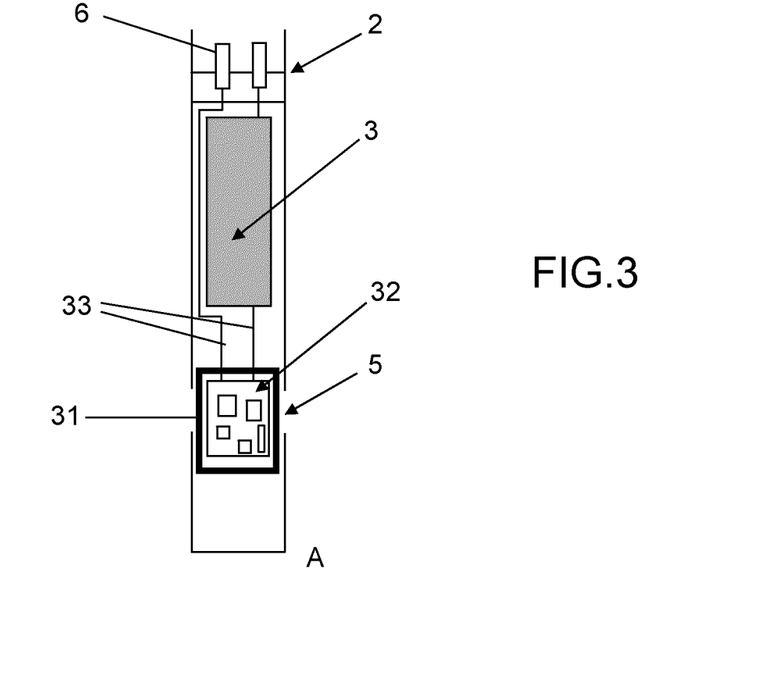
FIG. 3 schematically illustrates an example embodiment in a sectional view for an energy storage assembly device for an aerosol generation device, according to the invention.

Referring to FIG. 3, this schematically illustrates in a sectional view a further example embodiment for an energy storage assembly device. One difference as compared to the example illustrated in FIG. 3, is that vent components 5, 31, in addition to the plurality of holes 5, further comprise a carrier 31, which carries or holds a PCBA 32 (Printed Circuit Board Assembly). The PCBA 32 may for example be configured to perform control of the aerosol generation device (other components of aerosol generation device not shown in FIG. 3). The carrier 31 is configured to blind the plurality of hole 5 during normal operation of the energy storage assembly, similar to the blinding member 4 known from FIG. 1. The PCBA 32 is connected to the electrical contacts 6 by means of breakable electrical connections 33.

The carrier 31, similar to blinding member 4, has, at least towards the plurality of holes 5, the first visual aspect different from and contrasting with the second visual aspect of the housing 2 as visible from an outside, in a way that any carrier alteration is easily visually detected by an intended user (visual aspects and intended user are not illustrated in FIG. 3). A visual aspect may be an effect that is perceivable by a human eye, such as for example an angle at which light is reflected, a surface pattern, a color.

The carrier 31 may for example be a plastic frame.

Figure 4:
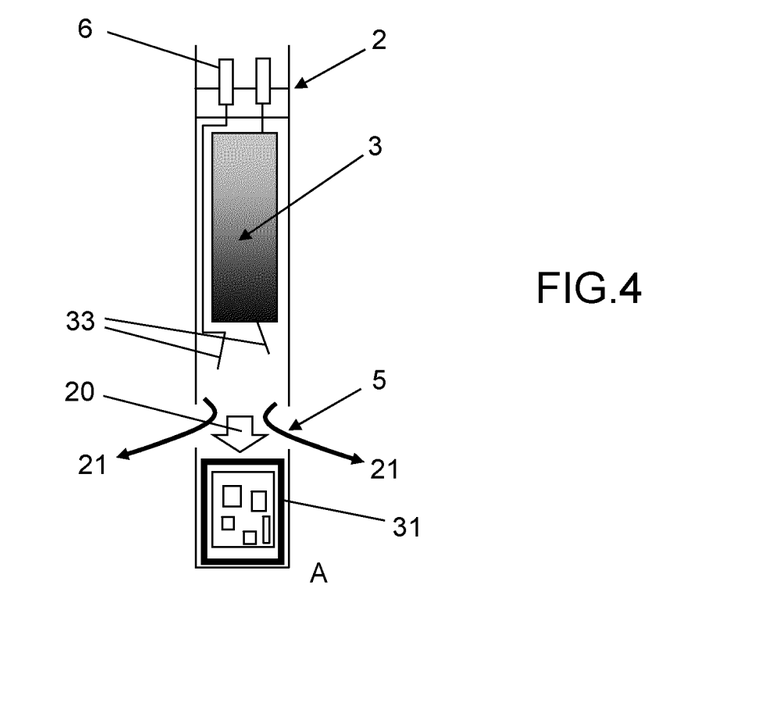
FIG. 4 schematically illustrates the same example embodiment as in FIG. 3, after the intended battery has vented.

Referring to FIG. 4, this schematically illustrates the example embodiment for the energy storage assembly as shown in FIG. 3, after the battery 3 has vented. The venting causes the production of pressurized gas which exerts pressure toward the first extremity A as illustrated by the thick arrow 20, and, in case the predetermined pressure occurs and is exceeded inside the housing 2, pushes the carrier 31 towards the first extremity A, thereby breaking the breakable electrical connections 33. The venting holes 5 are opened allowing venting gases 21 to escape through them. In other words, the carrier 31 is configured to be pushed away from the plurality of holes 5 to open at least a part of the plurality of holes 5 in case of the predetermined pressure occurring inside the housing 2. At the same time, the PCBA 32 is disconnected, since the breakable electrical connections 33 are broken, this having the effect of disconnecting the PCBA 32 from the battery, and thus the aerosol generation device cannot operate, preventing any potential adverse effect of operating the energy storage assembly and also preventing dangerous using cases when the battery has vented and not healthy to continue working.

Alternatively, the carrier 31 does not necessarily contain or hold PCBA and just performs its function without carrying any PCBA. In this embodiment, there are also no breakable electrical connections.

Figure 5:
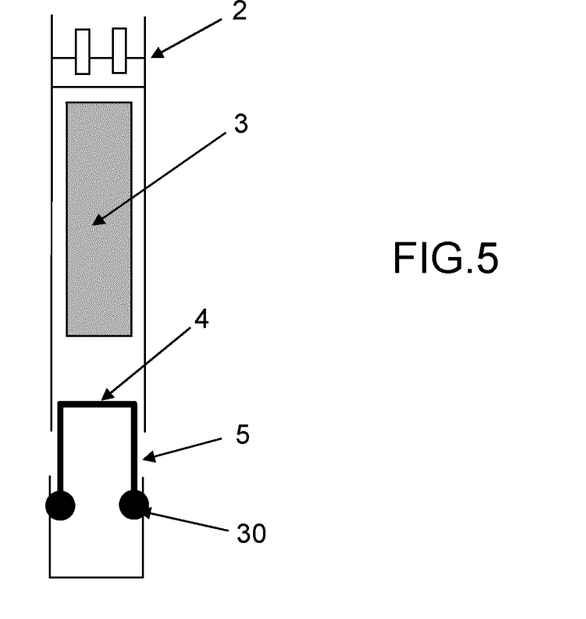
FIG. 5 schematically illustrates an example embodiment in a sectional view for an energy storage assembly device for an aerosol generation device, which is similar to that of FIG. 1.

Referring to FIG. 5, this schematically illustrates an example embodiment in a sectional view for the energy storage assembly device 1 for an aerosol generation device, which is similar to that of FIG. 1. Again the intended battery 3 is illustrated in FIG. 5 for a better understanding, but is not a necessary part of the invention. In addition, the inside of the housing 2 comprises a plurality of fixation points 30 configured to fix the blinding member 4 to the inside of the housing 2.

Figure 6:
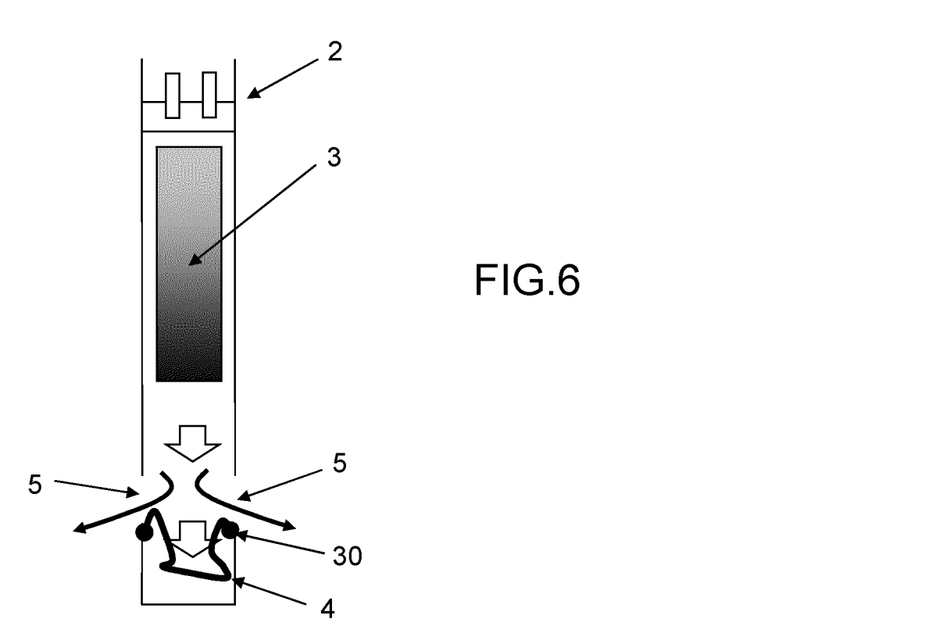
FIG. 6 this schematically illustrates the example embodiment for an energy storage assembly device as shown in FIG. 5, after the intended battery has vented.

Referring to FIG. 6, this schematically illustrates the example embodiment of the energy storage assembly device 1 as shown in FIG. 5, after the battery 3 has vented. FIG. 6 clearly shows how the fixation points 30 help to retain the blinding member 4 as this is deformed under the effect of pressurized gas.

Figure 7:
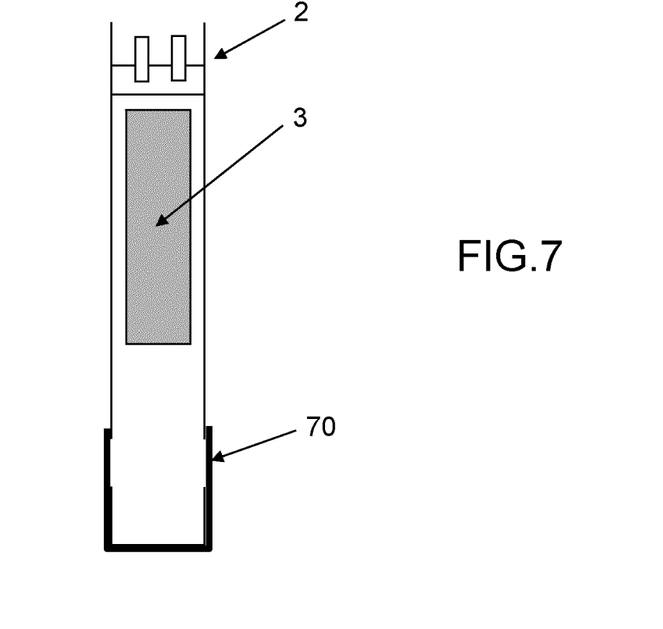
FIGS. 7 and 8 illustrate schematic sectional views of an example embodiment for an energy storage assembly device for an aerosol generation device respectively in a normal usage situation and in a battery venting situation, according to the invention.
Figure 8:
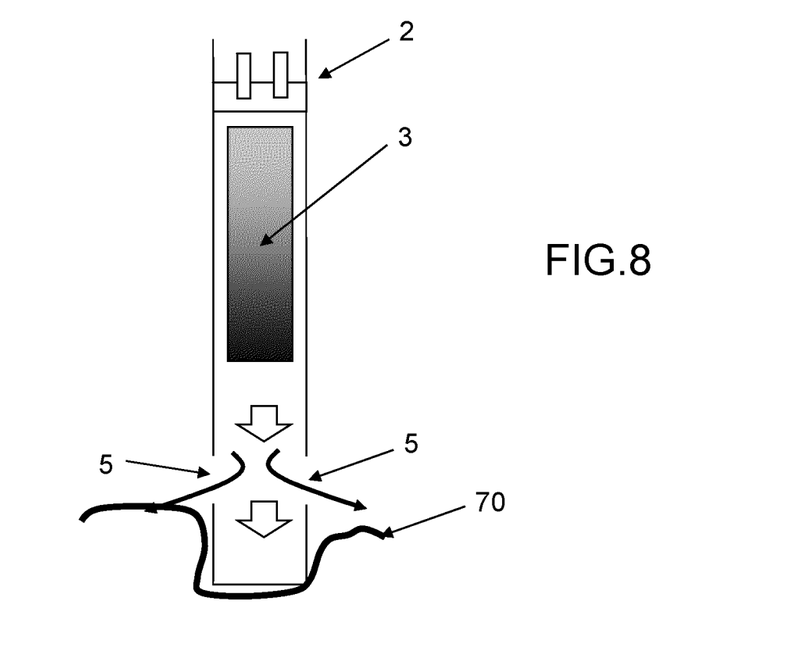

Referring to FIGS. 7 and 8, these illustrate schematic sectional views of an example embodiment for an energy storage assembly device for an aerosol generation device respectively in a normal usage situation and in a battery venting situation. Unlike FIGS. 1 and 2, a blinding member 70 covers the first plurality of holes 5 from an outside of the sealing housing 2. In case of the battery venting in FIG. 10, the pressurized gas pushes the blinding member 70 and opens at least some of the first plurality of holes 5 in order to escape from the inside of the housing 2.

Figure 9:
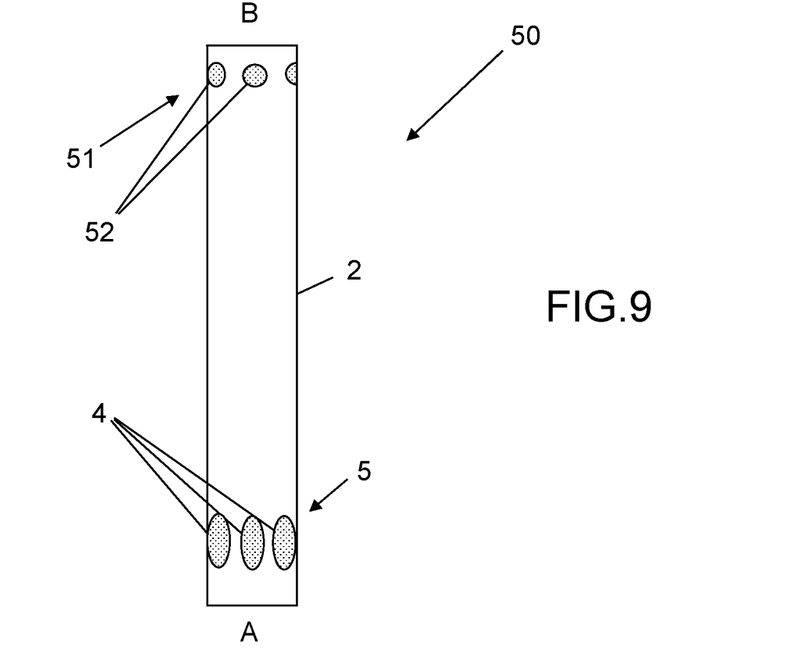
FIGS. 9 and 10 illustrate a schematic and external view of an example embodiment for an energy storage assembly device, according to the invention.
Figure 10:
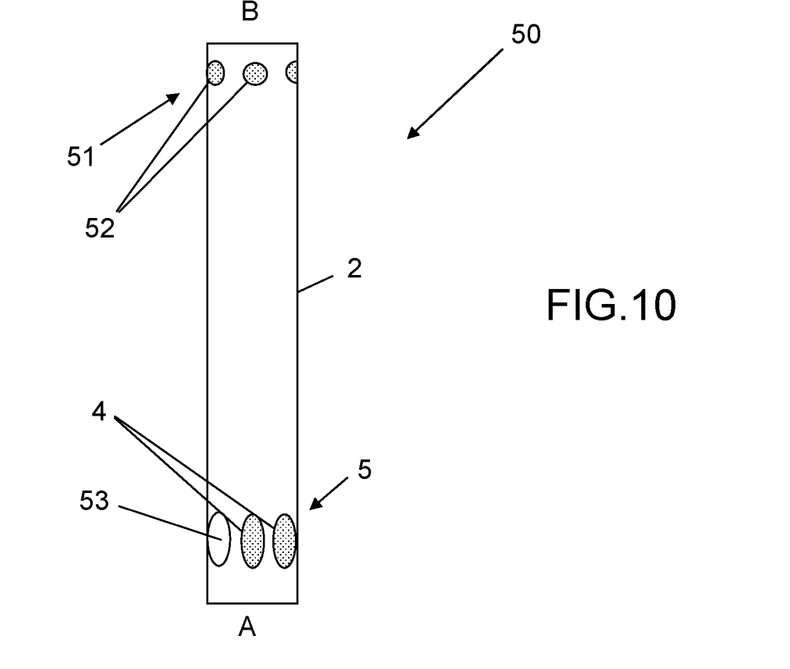

Referring to FIGS. 9 and 10, these illustrate a schematic and external view of an example embodiment for an energy storage assembly device 50, in which the housing 2 comprises on a circumference of the housing 2 at a second extremity B, opposite to the first extremity A, which is free on the inside from being filled by the battery (not illustrated in FIGS. 9 and 10), a second plurality of holes 51 blinded from the inside by a second blinding member 52, both of the second plurality of holes 51 and second sleeve 52 being part of the vent component.

Herein, an extremity refers to the region between a location where the battery 3 is intended to be arranged and an end of the housing. Accordingly, extremity B is not limited to the furthest part of the housing towards end B, and also includes a middle region as shown in FIG. 9. Furthermore, the plurality of holes 51 may be replaced with one single hole 51.

FIGS. 9 and 10 further illustrate the first plurality of holes 5, which in FIG. 9 are covered from the inside by the blinding member 4, but in FIG. 10, due to a venting of the battery (battery not shown in FIGS. 9 and 10), only a part of the first plurality of holes 5 remain covered from the inside by the blinding member 4, while one hole 53 of the first plurality of holes 5 is not covered anymore but opened to let gas escape through it. The one hole 53 is clearly identifiable by an intended user, and indicates that the battery has vented and the device should be discarded.

Each of the first plurality of holes 5 or the second plurality of holes 51 may have a shape that is adapted to an amount of gas to be vented in case of battery venting, including a round shape, an oval shape, a rectangular shape, a polygon shape etc. (some of these shapes are not illustrated in FIGS. 9 and 10).

In a preferred embodiment, each of the holes of the first plurality of holes 5 has an oval shape, oriented according to a longitudinal direction of the elongated shape. This is as illustrated in FIGS. 9 and 10.

The energy storage assembly device is assembled into an aerosol generation device in a way that the first extremity A corresponds to or close to the non-inhalation end of the aerosol generation device, an end opposite to the inhalation side of the aerosol generation device. This is because the pressurized gas is hot and dangerous to user, and safer to be vented out far from the inhalation side.

Figure 11:
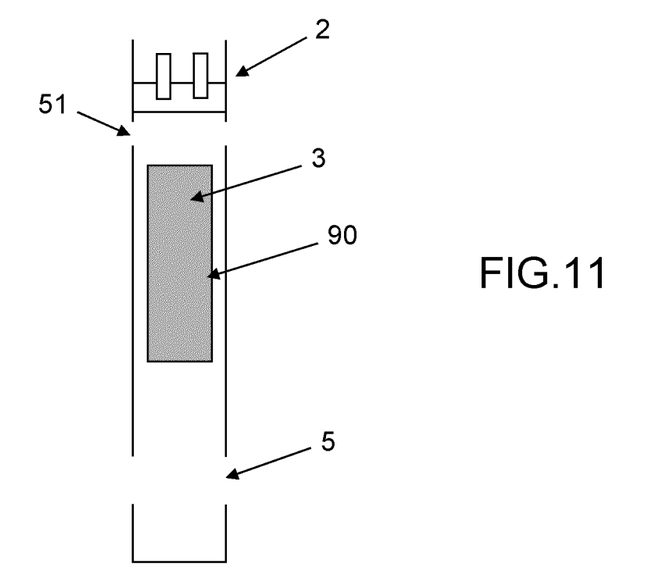
FIGS. 11 and 12 illustrate schematic sectional views of an example embodiment for an energy storage assembly device for an aerosol generation device respectively in a normal usage situation and in a battery venting situation, according to the invention.
Figure 12:
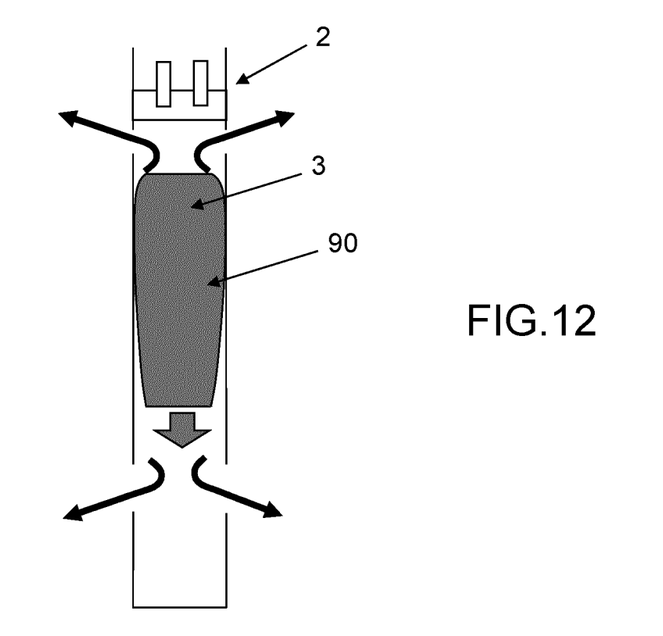

Referring to FIGS. 11 and 12, these illustrate schematic sectional views of for an energy storage assembly device for an aerosol generation device respectively in a normal usage situation and in a battery venting situation. FIGS. 11 and 12 show a use case scenario for the first plurality of holes 5 and the second plurality of holes 51 already illustrated in FIGS. 9 and 10, whereby no blinding member is illustrated in FIGS. 11 and 12, this having already been explained from previous examples where the blinding member was either covering holes from the inside or the outside. Any of the previously described specificities may be implemented in the present structure of arranging holes on both extremities.

During a thermal runaway/dysfunction of the battery 3, the latter may swell, for example at a location 90 indicated both in FIGS. 11 and 12, whereby the swelling of the battery 3 may be seen in FIG. 12 only, thereby filling a possible gap between the battery 3 and the housing 2, and potentially blocking gases in an area of the housing 2 without any possible release. Having holes situated at both extremities of the housing 2, embodied for example as the first plurality of holes 5 and the second plurality of holes 51, allows gas to evacuate in any situation and avoid the blocking of gases.

Figure 13:
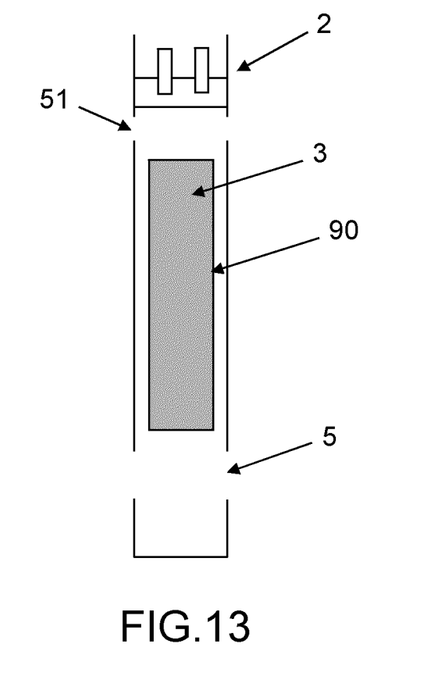
FIG. 13 illustrates a schematic sectional view of an example embodiment for an energy storage assembly device for an aerosol generation device, similar as that shown in FIG. 11.

Referring to FIG. 13, this illustrates a schematic sectional view of an example embodiment for an energy storage assembly device for an aerosol generation device, similar as that shown in FIG. 11. It is reminded that in case of a thermal runaway/dysfunction of the battery 3, and even in the presence of the first plurality of holes 5 and the second plurality of holes 51 in the housing 2, it may happen that a volume of gas generated cannot be released sufficiently fast from the housing 2, thus over-pressuring the battery 3 and/or the housing 2, which in turn may cause any one of the latter two to break in an impredictable way. It is therefore important, especially when the energy storage assembly device is used in an aerosol generation device, to generate in the housing 2 by means of a mechanical machining process a predefined rupture scheme, i.e., a weak point, preferably at the opposite of the intended user's face.

Many different rupture schemes may be realised, involving size, shape and distribution of holes, but also types of blinding member and thickness of wall(s).

Figure 14:
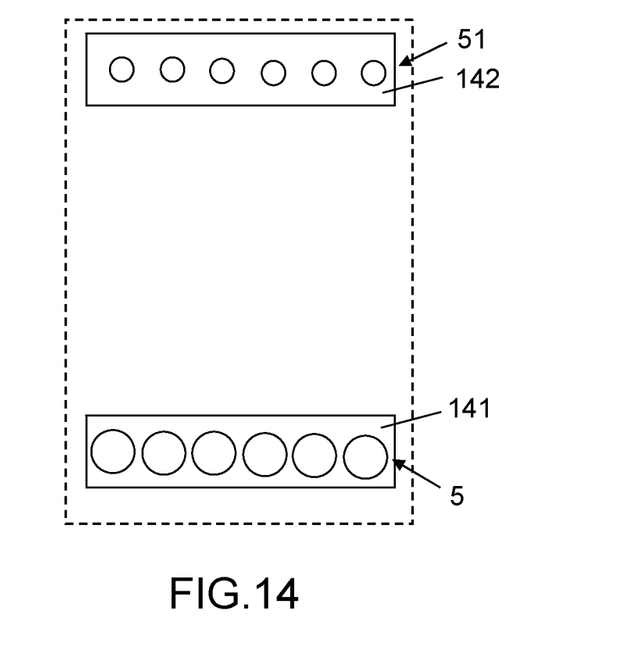
FIG. 14 illustrates an example for a first plurality of holes and a second plurality of holes in a housing, in a "rolled out" representation, according to the invention.

FIG. 14 illustrates an example for the first plurality of holes 5 and the second plurality of holes 51 in the housing 2, in a "rolled out" representation. The holes of the second plurality of holes 51 have a smaller diameter than the holes of the first plurality of holes 5, while the counts of the second plurality of holes 51 and the first plurality of holes 5 are the same. Thus a first surface (of blinding member, not represented in FIG. 14) presented by the first plurality of holes 5 is greater than a second surface presented by the second plurality of holes 51, making it more likely in a case of pressure buildup that the gas would escape with a greater flow through the first plurality of holes 5, and further making this side to be located in the aerosol generation device away from the intended user's face (aerosol generation device and intended user's face not illustrated in FIG. 14). This is because the pressurized gas is hot and dangerous to user, and safer to be vented out far from the inhalation side. Also, and importantly, there is less material of the housing 2 remaining around the first plurality of holes 5, than around the second plurality of hole 51, making it more likely that the housing 2 would rupture in the area of the first plurality of holes 5 in case of extreme pressure buildup inside the housing 2.

The first plurality of holes 5 may be confined to a determined section 141, and the first plurality of holes 5 covers a first hole's surface that corresponds to, e.g., 50% of the determined section 141. The percentage can be shifted larger or smaller depending on design of the aerosol generation device.

The second plurality of holes 51 may be confined to a second determined section 142, and the second plurality of holes 51 covers a second hole's surface that corresponds to, e.g., 25% of the second determined section 142. The percentage can be shifted larger or smaller depending on design of the aerosol generation device.

Figure 15:
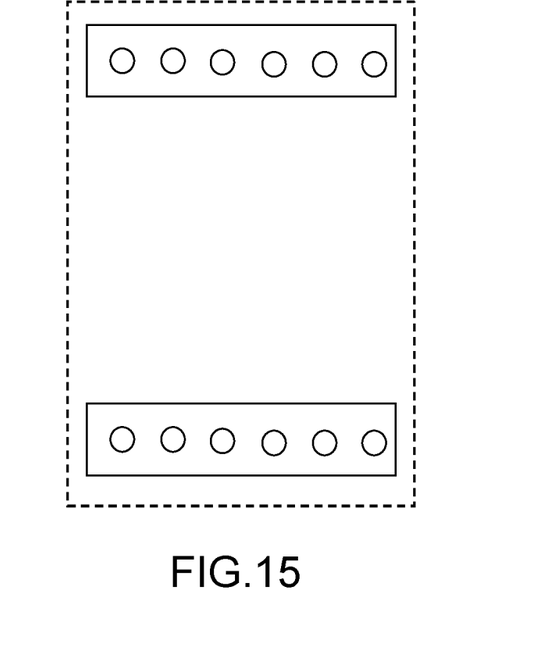
FIG. 15 illustrates a further example for the first plurality of holes and the second plurality of holes in the housing, in a "rolled out" representation, according to the invention.
Figure 16:
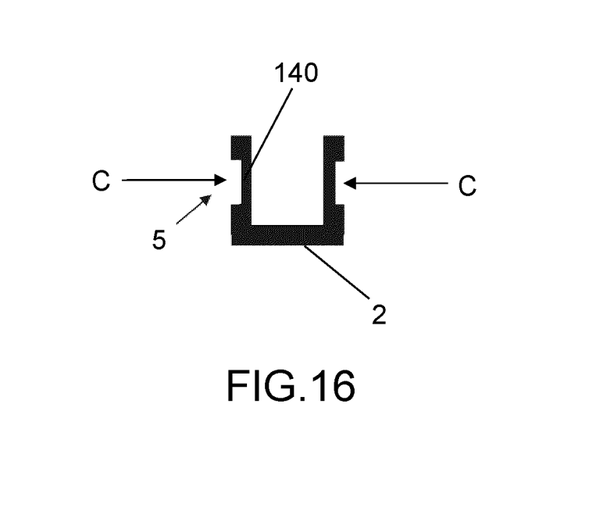
FIG. 16 illustrates an example in which a wall thickness of the housing between each one of the first plurality of holes is reduced as compared to a normal wall thickness of the housing, according to the invention.
Figure 17:
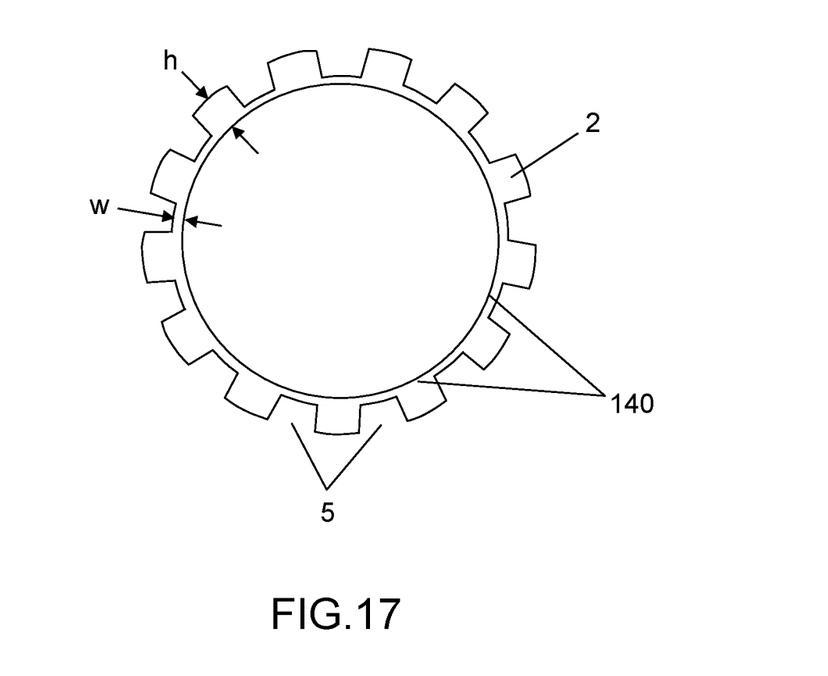
FIG. 17 schematically illustrates a cross-section of the housing from FIG. 16, along a plane indicated by arrows C.

FIG. 15 illustrates a further example for the first plurality of holes 5 and the second plurality of holes 51 in the housing 2, in a "rolled out" representation. The holes of the second plurality of holes 51 have a similar diameter than the holes of the first plurality of holes 5, and their numbers are the same. Thus a first surface (of blinding member, not represented in FIG. 15) represented by the first plurality of holes 5 is substantially the same than a second surface presented by the second plurality of holes 51, making it likely in a case of pressure buildup that the gas would escape with a similar flow through the first plurality of holes 5 as through the second plurality of holes 51. However, it is possible, as illustrated in FIG. 16, to engineer each of the holes of the first plurality of holes 5 to be blinded by walls 140, for example, such that a wall thickness of the walls 140 is lesser than a normal wall thickness of the housing 2, making it more likely that a rupture of the wall occurs at the part with thinner walls in case of extreme pressure buildup. FIG. 17 schematically illustrates a cross-section of the housing 2 along a plane indicated by arrows C in FIG. 16, showing how a thickness w of walls 140, is lesser than that of the normal wall thickness h of the housing 2. The side of the housing 2 at which the holes connected by thinner walls is located should be oriented away from the intended user's face when designing the aerosol generation device, in order to reducing risks of injury.

The invention claimed is:

1. An energy storage assembly device for an aerosol generation device, comprising:

a housing intended for housing a battery;

a vent component configured to vent pressurized gases from within the housing upon a predetermined pressure in the housing;

whereby the housing has an elongated shape; and the housing comprises on a circumference of the housing at a first extremity which is free on an inside from being filled by the battery, a first plurality of holes blinded by a blinding member, the first plurality of holes and the blinding member each being part of the vent component, wherein blinding member alteration by pressurized or hot gas is easily visually detected after venting.

2. The energy storage assembly device of claim 1, wherein the blinding member has towards the first plurality of holes a first visual aspect different from and contrasting with a second visual aspect of the housing as visible from an outside.

3. The energy storage assembly device of claim 2, wherein each of the holes of the first plurality of holes has an oval shape, oriented according to a longitudinal direction of the elongated shape.

4. The energy storage assembly device of claim 1, wherein the housing comprises on a circumference of the housing at a second extremity, opposite to the first extremity, which is free on an inside from being filled by the battery, a second plurality of holes blinded by a second blinding member, the second plurality of holes and the second blinding member each being part of the vent component.

5. The energy storage assembly device of claim 1, wherein the blinding member blinds the first plurality of holes from an inside of the housing.

6. The energy storage assembly device of claim 1, wherein the blinding member comprises a sleeve configured to deform when the predetermined pressure occurs inside the housing to open the first plurality of holes.

7. The energy storage assembly device of claim 6, wherein the blinding member is configured to be pushed away from the first plurality of holes to open at least a part of the first plurality of holes when the predetermined pressure occurs inside the housing.

8. The energy storage assembly device of claim 7, wherein the blinding member comprises a carrier configured to carry a printed circuit board assembly that is configured to connect to the battery through breakable electrical connections.

9. The energy storage assembly device of claim 5, wherein the inside of the housing comprises a plurality of fixation points configured to fix the blinding member to the inside of the housing.

10. The energy storage assembly device of claim 1, wherein the blinding member blinds the first plurality of holes from an outside of the housing.

11. The energy storage assembly device of claim 1, wherein the blinding member comprises a water-repellent coated sheet of material.

12. The energy storage assembly device of claim 1, wherein the blinding member is made out of a same material as a wall of the housing; further wherein a first wall thickness of housing wall portions corresponding to the blinding member blinding the first plurality of holes, is smaller than a second normal wall thickness of the housing, in order to enable a preferred rupture point at a location of the first plurality of holes.

13. The energy storage assembly device of claim 1, further comprising a battery housed in the housing, the battery comprising venting apertures configured to vent pressurized gases from inside the battery.

14. The energy storage assembly device of claim 11, wherein the material is silicon rubber.

15. The energy storage assembly device of claim 11, wherein the material is aluminum.

16. An aerosol generation device comprising:
a housing intended for housing a battery;
a vent component configured to vent pressurized gases from within the housing upon a predetermined pressure in the housing;
whereby the housing has an elongated shape; and
the housing comprises on a circumference of the housing at a first extremity, which is opposite to an inhalation side of the aerosol generation device, and which is free on an inside from being filled by the battery, a first plurality of holes blinded by a blinding member, the first plurality of holes and the blinding member each being part of the vent component.

17. The device of claim 16, wherein the blinding member has towards the first plurality of holes a first visual aspect different from and contrasting with a second visual aspect of the housing as visible from an outside, in a way that any blinding member alteration is easily visually detected by an intended user.

18. The device of claim 16, wherein the blinding member blinds the first plurality of holes from an inside of the housing.

19. The device of claim 16, wherein the blinding member blinds the first plurality of holes from an outside of the housing.

20. The device of claim 16, wherein the blinding member comprises a sleeve configured to deform when the predetermined pressure occurs inside the housing to open the first plurality of holes.

* * * * *